July 24, 1956 — T. W. JOHNSON — 2,755,588
FLOATABLE DECOY
Filed Aug. 3, 1953
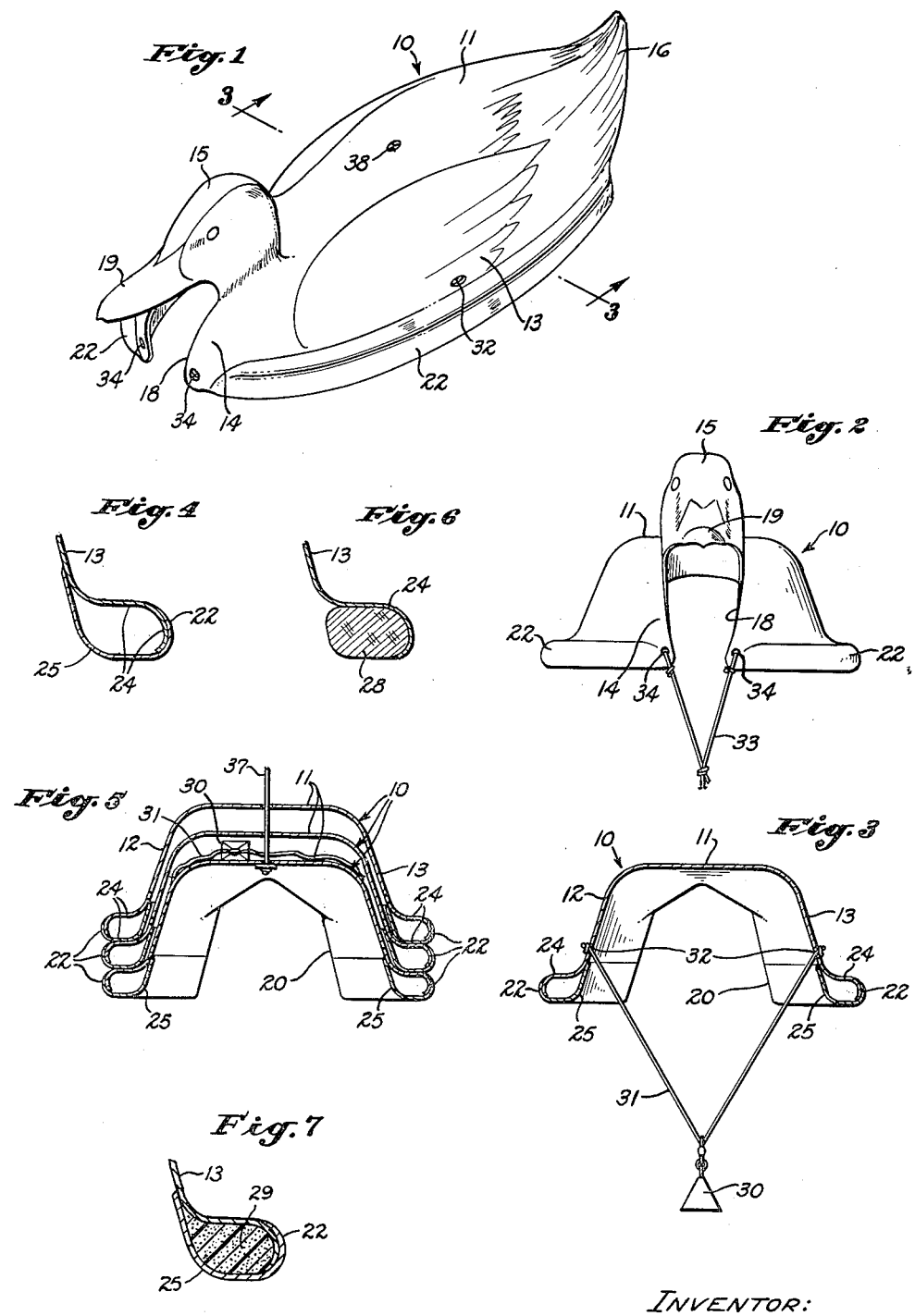
INVENTOR:
THOMAS W. JOHNSON
By N. J. Stevenson 2,755,588
Patented July 24, 1956

2,755,588
FLOATABLE DECOY
Thomas W. Johnson, Los Angeles, Calif.

Application August 3, 1953, Serial No. 372,091

8 Claims. (Cl. 43—3)

This invention relates to decoys and particularly to floatable decoys such as are frequently used when hunting water fowl, for example wild ducks.

It is an object of this invention to obviate the disadvantages and deficiencies of the prior decoys, by providing a floatable decoy which is constructed from a lightweight, substantially rigid material, such as molded, resin-impregnated, fiber-glass cloth, or suitable types of thermoplastic sheeting, the decoy thus being practically indestructible and requiring little, if any, servicing or maintenance, the material being non-hydroscopic and proof against deterioration.

Another object of the invention is to provide a buoyant decoy which closely resembles a duck when floating upon the water, the one-piece molded structure being in the nature of an inverted hollow shell, the front and rear portions, that is the breast and tail portions, being cut away to thus form, in effect, a channel-shaped structure. By this construction, the one-piece decoys are capable of being nested, one within another, with the body and head portions of each decoy fitting within the corresponding portions of another decoy, this being an important feature and object of the invention.

As another important object, the invention provides a decoy, of the character referred to above, which is provided with pontoon or float means along its lower, curved, longitudinal edges, the pontoon means being in the nature of either closed-end tubular portions of the glass-cloth material or strips of wood, cellular plastic or other floatable material secured to the side edges of the decoy and producing the degree of buoyancy necessary to maintain the decoy floating upright on the water. A related object of the invention is to provide a decoy in which the pontoon or float means is located laterally beyond the confines of the shell-like body, thus providing, in effect, an outrigger device which insures great stability and avoids upsetting or capsizing of the decoy when the latter is subjected to high winds and waves. In addition, by so locating the pontoons or floats, they serve as seats or ledges against which the corresponding pontoons of an adjacent decoy of a series of stacked decoys rest so as to maintain the sides, back portions, heads and tails in spaced relation, and thus avoid abrasion between the painted surfaces.

Another object of the invention is to provide a decoy, of the class indicated, which includes ballast means for assisting in stabilizing the decoy in the water, this means consisting of a small weight suspended from a V-shaped cord or sling having its ends connected to the sides of the decoy at the approximate longitudinal center thereof. As a particular feature, the weights and slings of the decoys are adapted to be concealed in the spaces occurring between the backs of the nested decoys. In accordance with the invention, the decoy is provided with holes at its forward end for receiving an anchor cord by which the decoy may be held in selected positions on the water. The decoys are further provided with holes in their upper back portions for receiving a cord or wire onto which the decoys may be strung in nested relation.

A further object of the invention is to provide a decoy which is extremely simple in construction and one which lends itself to mass production so as to maintain the manufacturing cost at a minimum, one which is strong and durable in use, and one which is extremely light in weight, on the order of approximately four ounces.

Further objects of the invention will appear from the following description and from the drawing, which is intended for the purpose of illustration only, and in which:

Fig. 1 is a perspective view of my improved decoy;

Fig. 2 is a front view of the same;

Fig. 3 is a cross-sectional view, taken substantially on line 3—3 of Fig. 1;

Fig. 4 is an enlarged cross-sectional view through one of the pontoons of the decoy;

Fig. 5 is a cross-sectional view through several decoys, illustrating the manner in which they may be stacked in nested relation;

Fig. 6 is a view similar to Fig. 4 showing an alternative form of pontoon; and

Fig. 7 is a view similar to Fig. 4, showing a further modified form of pontoon.

Referring first to Figs. 1 to 5 in detail, the improved decoy is shown as consisting of a hollow, shell-like body 10 having the general shape and size of a duck, the body including a back 11, concavo-convex sides 12 and 13, a breast portion 14, a head 15 and tail 16. While the body 10 may be constructed from various materials, it is preferably made from fiber-glass cloth impregnated with thermo-setting resin, the article being formed in a suitable mold under the combined action of heat and pressure.

As illustrated, the molded decoy is provided with a cut-away opening 18 at its forward end, the opening extending upwardly from the lower edge to the bill or beak 19 of the duck, the edges of the material which define the opening also forming the lower edge of the bill which, as shown, is open at its lower portion. The decoy preferably, although not necessarily, has an opening 20 at its rearward end.

As shown in Figs. 3 and 4, the decoy is provided with longitudinal pontoons 22 at its lower edge portions, the pontoons extending from a point adjacent the sides of the forward opening 18 to a point adjacent the side edges of the rearward opening 20. As will become apparent, the pontoons may be formed in a variety of ways. However, I have found that they may be formed quickly and economically by so molding the decoy that it is provided with laterally and downwardly projecting flanges 24 at its lower, longitudinal edges. Strips 25 of the glass cloth are of channel cross-sectional shape and have their longitudinal edge portions cemented, or otherwise bonded, to the outer surfaces of the flanges 24 and against the inner surfaces of the sides 12 and 13 of the decoy structure, as shown best in Fig. 4. The strips 25 preferably are impregnated with resin which hardens when subjected to heat. The flanges 24 and strips 25 together define the hollow pontoons 22 and it is to be observed that the hollow pontoons are located laterally beyond the sides 12 and 13 to provide, in effect, outriggers which serve to stabilize, as well as provide sufficient buoyancy to cause the decoy to float evenly upon the water. As shown in Figs. 1 and 2, the hollow pontoons follow the longitudinally curved contour of the lower edges of the sides 12 and 13 and their ends are closed. If preferred, the hollow pontoons 22 may contain cellular material 29 which may be injected into the pontoons in plastic form and thereafter expanded or puffed up by the application of heat. In this embodiment, shown in Fig. 7 it is not necessary that the ends of the pontoons be closed.

In lieu of the strips 25 which, together with the flanges 24, provide the pontoons, the decoy may be provided with pieces 28 of wood, cork, cellular plastic or other buoyant material which may be cemented, stapled or otherwise secured in place against the inner sides of the flanges 24, as shown in Fig. 6.

The molded decoy as described above has a relatively smooth external surface which may be readily decorated with paint or lacquer to provide the appropriate colors and markings of the ducks to be lured by the decoys.

The finished decoy is extremely light in weight, approximately four ounces, so that when it is floating upon the water it may have the tendency to bob excessively when subjected to choppy waves. To avoid this condition, I provide ballast or stabilizing means in the form of small weight 30 which is suspended beneath the decoy by a sling 31, the latter being simply a cord having ends passing through holes 32 in the sides 12 and 13 and knotted at the exterior of the sides.

It is desirable that the decoy be anchored in the selected location and for this purpose cords 33 may be tied through holes 34 at the forward end, the cords carrying suitable anchor weights, not shown.

As previously indicated, one of the outstanding features of the present improved decoy is its ability to nest within another decoy of identical form. By this provision, a plurality of the decoys may be stacked, one upon another, to provide a compact assembly of the decoys which greatly facilitates storing, shipping and carrying by the hunter.

To produce such a compact package or stack of the decoys, one decoy is placed upon a surface and another decoy is placed thereover with its pontoons 22 resting upon the seats or ledges provided by the horizontal portions of the flanges 24 of the first decoy. Other decoys are placed successively upon the previously stacked decoys until the required number have been assembled in nested relation. During the nesting of the decoys, the bill or beak of each decoy enters the hollow underside of the beak of the next adjacent decoy through the opening 18 thereof. The several decoys may be retained in stacked relation by means of a cord or wire 37 which is threaded through aligned holes 38 provided at the center of the backs 11.

It is to be noted that when the several decoys are stacked, their pontoons 22 rest upon one another, the pontoons being of such height that the side, back, head and tail portions of the decoys are caused to assume a spaced relation. The spaces thus formed provide compartments for receiving the ballast means 30, 31 and anchor cords 33.

The stack of nested decoys thus formed constitutes a compact unit which occupies a very small space and thus may be conveniently stored in an automobile during transportation and carried in a knapsack or other holder by the sportsman. In the event that the usual number of decoys are handled by a hunter, say twenty-five, the entire package may weigh approximately six to seven pounds so that the usual fatigue experienced when a like number of conventional wooden decoys are carried long distances, is effectively avoided.

It will be observed from the foregoing that the present invention provides a highly practical and efficient decoy for use by hunters. The decoy is very strong and durable in use and due to its non-hydroscopic nature, it is not subject to rotting or deterioration due to various causes. Consequently, the decoy will last almost indefinitely with the exercise of ordinary care.

As a particular feature of the invention, the hollow decoys are so constructed that they may be nested, one within another, to provide a stack or assembly which is of a very compact size to adapt it to be conveniently stored in a small space and carried by the sportsman. As has been pointed out, it has previously been thought impossible to nest together a plurality of hollow decoys having integral head and tail portions. According to the present invention this difficulty is overcome by providing an opening at the front end of each decoy to allow insertion of the integral head of a decoy into the corresponding portion of another decoy. The rear openings 20 serve a like purpose but it is possible to so shape the tail portions of the decoys that these openings can be omitted. Thus, the present improved decoys may be stacked without requiring detachment of any of their parts.

As another feature of improvement, the one-piece decoy is provided with pontoon means extending lengthwise along its sides, this means being located outside the confines of the hollow structure and thus serving as outriggers to effectively stabilize the decoy on the water. The pontoons further serve as ledges upon which the pontoons of the next adjacent decoy rest when the decoys are nested, the height of the pontoons being such that the painted surfaces of the nested decoys are maintained in spaced relation to avoid damage thereto.

In accordance with the patent statutes, I have described the principle of the invention, together with the decoys which I now consider to represent the best embodiments thereof. However, I wish to have it understood that the invention may be carried out by further modified structures within the spirit and scope of the appended claims.

I claim as my invention:

1. A floatable water-fowl decoy, consisting of: a molded shell structure of thin, rigid, water-impervious material resembling a water-fowl and having a back, sides depending from the back, a front portion providing the breast and neck, a rear portion providing the tail, and a head and bill portion above said front portion, said front and rear portions having cut-away openings, the rear opening being of larger area than the front opening, said bill portion having an open bottom the edges of which are continuations of the edges of the cut-away opening in said front portion, and pontoons extending along the lower edge portions of said sides and disposed laterally outside the confines of said shell structure, said pontoons consisting of laterally and downwardly extending flanges formed integrally with said shell, the pontoons having upper surfaces providing ledges upon which the corresponding pontoons of a like decoy may seat when the decoys are stacked in nested relation, the height of the pontoons being such as to maintain the shell structures of the nested decoys in spaced relation, each pontoon also including a strip of buoyant material secured to each of said flanges and located laterally outside the confines of said shell structure.

2. A plurality of floatable and nestable water-fowl decoys, each consisting of a thin, rigid, water-impervious shell structure resembling a water-fowl and having a back, sides depending from the back, a front portion providing the breast and neck, a rear portion providing the tail, and a head and bill portion above said front portion, said front and rear portions having cut-away openings, said bill portion having an open bottom the edges of which are continuations of the edges of the cut-away opening in said front portion, and pontoons extending along the lower edge portions of said sides and disposed laterally outside the confines of said shell structure, said pontoons consisting of laterally and downwardly extending flanges formed integrally with said shell, the pontoons having upper surfaces providing ledges upon which the corresponding pontoons of a like decoy is seated when the decoys are stacked in nested relation, the height of the pontoons being such as to maintain the shell structures of the nested decoys in spaced relation, each pontoon also including a strip of buoyant material secured to and within each of said flanges and located laterally outside the confines of said shell structure, the bill portion of each decoy entering the bill portion of the next upper decoy of the stack through the cut-away opening in the front portion thereof and the tail of each decoy entering the tail of the next upper decoy of the stack through the cut-away opening in the rear portion thereof to allow such nesting, the area of the cut-away opening in the rear portion being larger than the cut-away opening in the front portion, and means extending through the backs of the decoys to maintain them in nested relation.

3. A plurality of decoys as defined in claim 2, in which the backs of the decoys have aligned holes through which a cord or the like can be threaded to tie the decoys in stacked relation.

4. A floatable decoy comprising a one piece, rigid, hollow shell structure composed of water impervious moldable material resembling a water fowl and having a back, concavo-convex sides depending from the back, said sides at their bottoms having longitudinally curved and transversely concave flanges, a front portion providing the breast and neck, a rear portion providing the tail, and a head and bill portion above said front portion, said front portion having a cutaway opening, said bill portion having an open bottom the edges of which are continuations of the edges of the cutaway opening in the front portion, and rigid pontoon means located laterally outside the confines of said shell structure to provide out-riggers capable of stabilizing the decoy on the surface of the water, the said pontoon means being curved longitudinally and consisting in part of the curved flanges projecting laterally and outwardly from said concavo-convex sides.

5. A floatable decoy as set forth in claim 4, wherein the rear portion has a cutaway opening of larger area than the front opening, and wherein the pontoon means have upper surfaces providing ledges upon which the corresponding pontoons of a like decoy sit when several decoys are stacked in nested relation.

6. A decoy as set forth in claim 4, wherein said pontoon means are hollow and have closed ends.

7. A decoy as set forth in claim 4, said pontoon means including strips of thin, rigid, water-impervious material of channel cross section bonded to the inner surfaces of the concavo-convex sides and to the said flanges; said pontoon means being closed at the ends thereof.

8. A decoy as set forth in claim 4, wherein the pontoon means include strips of buoyant material secured to and within the side flanges and located laterally and outside the confines of the sides of the shell structure.

References Cited in the file of this patent

UNITED STATES PATENTS

| | | |
|---|---|---|
| 957,750 | Cunningham | May 10, 1910 |
| 1,066,587 | Cunningham | July 8, 1913 |
| 1,604,614 | Stoner | Oct. 26, 1926 |
| 1,851,768 | Hubbell | Mar. 29, 1932 |
| 2,590,842 | Colgan | Apr. 1, 1952 |